US011086800B2

(12) United States Patent
Andrus et al.

(10) Patent No.: US 11,086,800 B2
(45) Date of Patent: Aug. 10, 2021

(54) EXECUTION SPACE AGNOSTIC DEVICE DRIVERS

(71) Applicant: Apple Inc., Cupertino, CA (US)

(72) Inventors: Jeremy C. Andrus, Sunnyvale, CA (US); Joseph R. Auricchio, Redwood City, CA (US); Russell A. Blaine, San Carlos, CA (US); Daniel A. Chimene, San Francisco, CA (US); Simon M. Douglas, Cupertino, CA (US); Landon J. Fuller, Cupertino, CA (US); Yevgen Goryachok, Los Gatos, CA (US); John K. Kim-Biggs, Pittsburgh, PA (US); Arnold S. Liu, Mountain View, CA (US); James M. Magee, Orlando, FL (US); Daniel A. Steffen, San Francisco, CA (US); Roberto G. Yepez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/882,087

(22) Filed: May 22, 2020

(65) Prior Publication Data
US 2020/0379925 A1 Dec. 3, 2020

Related U.S. Application Data

(60) Provisional application No. 62/855,948, filed on Jun. 1, 2019.

(51) Int. Cl.
*G06F 12/14* (2006.01)
*G06F 13/10* (2006.01)
(Continued)

(52) U.S. Cl.
CPC ........ *G06F 13/102* (2013.01); *G06F 9/44505* (2013.01); *G06F 9/545* (2013.01);
(Continued)

(58) Field of Classification Search
None
See application file for complete search history.

(56) References Cited

U.S. PATENT DOCUMENTS 6,289,396 B1 9/2001 Keller et al.
7,386,886 B1 * 6/2008 Abrams ................ G06F 12/145
709/232
(Continued)

OTHER PUBLICATIONS

Apple, Inc., "I/O Kit Device Driver Design Guidelines" retrieved from http://mirror.informatimago.com/next/developer.apple.com/documentation/DeviceDrivers/Conceptual/WritingDeviceDriver/WritingDeviceDriver.pdf, published Oct. 4, 2006, 180 pages.

*Primary Examiner* — Hyun Nam
(74) *Attorney, Agent, or Firm* — Morgan, Lewis & Bockius LLP

(57) ABSTRACT

Embodiments described herein provide techniques to manage drivers in a user space in a data processing system. One embodiment provides a data processing system configured perform operations, comprising discovering a hardware device communicatively coupled to the communication bus, launching a user space driver daemon, establishing an inter-process communication (IPC) link between a first proxy interface for the user space driver daemon and a second proxy interface for a server process in a kernel space, receiving, at the first proxy interface, an access right to enable access to a memory buffer in the kernel space, and relaying an access request for the memory buffer from the user space driver daemon via a third-party proxy interface to enable the user space driver daemon to access the memory buffer, the access request based on the access right.

20 Claims, 12 Drawing Sheets

(51) Int. Cl.
*G06F 13/40* (2006.01)
*G06F 9/54* (2006.01)
*G06F 9/445* (2018.01)
*G06F 13/16* (2006.01)

(52) U.S. Cl.
CPC .......... *G06F 9/546* (2013.01); *G06F 13/1673* (2013.01); *G06F 13/4072* (2013.01)

(56) References Cited

U.S. PATENT DOCUMENTS

| | | | |
|---|---|---|---|
| 2005/0005101 A1* | 1/2005 | Yenduri | G06F 21/57 713/164 |
| 2008/0021693 A1 | 1/2008 | Campbell et al. | |
| 2013/0268997 A1* | 10/2013 | Clancy, III | G06F 21/606 726/1 |
| 2015/0092778 A1* | 4/2015 | Jackson | H04L 45/64 370/392 |
| 2016/0112262 A1 | 4/2016 | Johnson et al. | |
| 2020/0327071 A1* | 10/2020 | Arcangeli | G06F 11/073 |

\* cited by examiner

EXECUTION SPACE AGNOSTIC DEVICE DRIVERS

CROSS-REFERENCE

This application claims priority to U.S. Provisional Application Ser. No. 62/855,948, filed on Jun. 1, 2019, the entire contents of each of which are hereby incorporated herein by reference.

TECHNICAL FIELD

This disclosure relates generally to data processing systems. More specifically, this disclosure relates to a system and associated methods for enabling device driver logic that is agnostic to execution space.

BACKGROUND

Data processing systems typically include an operating system to manage operations of the various components of the data processing system and to manage processes executing on those components. Operating systems typically include a kernel space which has access to substantially all resources and memory on the data processing system, and a user space, in which user operations are performed and which has limited access to system resources and memory.

Some existing operating systems manage drivers in the kernel space of the operating system, thereby affording the drivers direct access to the hardware that the drivers were to control. However, this arrangement can present security risks in certain situations. It some instances it may be beneficial to implement the primary logic of device drivers could be moved to user space, e.g., to enhance security and to isolate driver capabilities. Should a driver be compromised, the execution limitations applied to user space processes can limit the degree to which a compromised driver can access system resources.

SUMMARY

Embodiments described herein provide techniques to manage device drivers which operate in the user space of an operating system in a data processing systems.

One embodiment provides a data processing system, comprising a computer-readable memory to store data and instructions, a communication bus, one or more processors communicatively coupled to the communication bus, the one or more processors to execute instructions which cause the one or more processors to perform operations, comprising discovering a hardware device communicatively coupled to the communication bus, launching a user space driver daemon, establishing an inter-process communication (IPC) link between a first proxy interface for the user space driver daemon and a second proxy interface for a server process in a kernel space, receiving, at the first proxy interface, an access right to enable access to a memory buffer in the kernel space, and relaying an access request for the memory buffer from the user space driver daemon via a third-party proxy interface to enable the user space driver daemon to access the memory buffer, the access request based on the access right.

One embodiment provides for a non-transitory machine-readable medium storing instructions which, when executed by one or more processors of an electronic device, cause the one or more processors to perform operations comprising discovering a hardware device communicatively coupled to the communication bus, launching a user space driver daemon, establishing an inter-process communication (IPC) link between a first proxy interface for the user space driver daemon and a second proxy interface for a server process in a kernel space, receiving, at the first proxy interface, an access right to enable access to a memory buffer in the kernel space, and relaying an access request for the memory buffer from the user space driver daemon via a third-party proxy interface to enable the user space driver daemon to access the memory buffer, the access request based on the access right.

One embodiment provides for a computer-implemented method, comprising discovering a hardware device communicatively coupled to the communication bus, launching a user space driver daemon, establishing an inter-process communication (IPC) link between a first proxy interface for the user space driver daemon and a second proxy interface for a server process in a kernel space, receiving, at the first proxy interface, an access right to enable access to a memory buffer in the kernel space, and relaying an access request for the memory buffer from the user space driver daemon via a third-party proxy interface to enable the user space driver daemon to access the memory buffer, the access request based on the access right.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
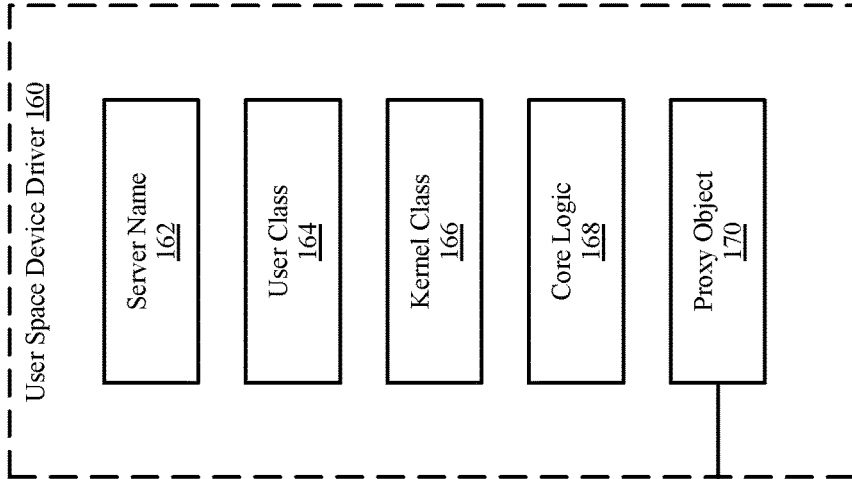
FIG. 1 is a schematic illustration of an operating system environment in which managing drivers in user space may be implemented, according to embodiments.
Figure 1:
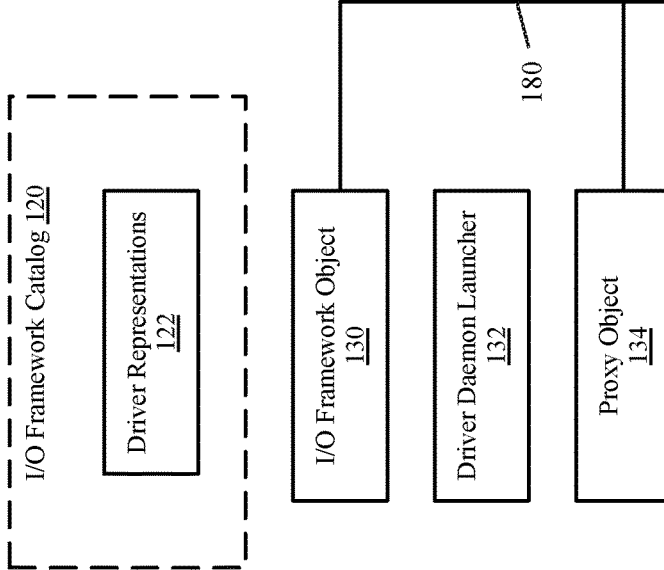

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of data processing systems, user interfaces for such devices, and associated processes for using such devices are described. In some embodiments, the data processing system may comprise a portable communication device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

As described above, operating systems typically include a kernel space, which has access to substantially all resources and memory on the data processing system, and a user space in which user operations are performed and which has limited access to system resources and memory. Some existing operating systems manage drivers in the kernel space of the operating system, thereby affording the drivers direct access to the hardware that the device drivers control. However, this arrangement can present security risks in certain situations. It some instances it may be beneficial to implement the primary logic of device drivers could be moved to user space, e.g., to enhance security and to isolate driver capabilities.

Subject matter described herein addresses these and other issues by providing systems and methods to enable execution space agnostic device drivers by allowing arbitrary device management logic to reside in user space of an operating system, rather than in kernel space of the operating system. In some examples described herein, a toolkit is provided to enable execution space agnostic device driver functionality. The toolkit enables a significant portion of the code of a device driver to reside in the user space of an operating system, rather than in the kernel space of the operating system. The user space driver can access kernel level functionality via a kernel proxy object that resides in the kernel space. The kernel proxy object can receive messages from the user space driver and perform direct access to the hardware on behalf of the user space driver. Access functionality that was previously linked with the main driver logic resident in the kernel space may be managed in the kernel space of the operating system. Further, the driver logic that executes in the user space communicates with the access functionality in the kernel space via an IPC interface. The IPC interface is dynamically generated based on class descriptions provided in the user space driver and the IPC relay is transparent to the driver logic, thereby enabling existing drivers to be migrated into user space with very little code modification. In some device drivers, functionality can be written that is agnostic to the execution space of the actual driver logic. Driver logic that executes in user space that performs an action that requires kernel execution privileges can execute that functionality via a proxy into kernel space logic. User mode logic can access resources (e.g., memory) that is allocated in kernel mode via the use of access rights that are vended to logic with legitimate access to those resources. In one embodiment, both user mode logic and kernel mode logic make use of explicit access rights to a resource when accessing the resource, for example, via a capability model. In one embodiment, access rights are implemented transparently for user space objects by the IPC interface, for example, by exchanging the port send and receive rights that are used to implement the underlying IPC channels.

FIG. 1 is a schematic illustration of an operating system environment 100 in which managing drivers in user space may be implemented, according to embodiments. In one embodiment the operating system environment 100 includes a kernel space 110 and a user space 150. Driver representations 122 can be stored in an I/O framework catalog 120 catalogue, with kernel mode drivers defined as kernel extensions and user mode drivers defined as user space drivers.

User space drivers can have functionality that largely resides in user space 150. Use space drivers can also include logic that is execution space agnostic can be reside in either kernel space 110 or user space 150. Some user space drivers can be configured with operational logic that is mixed between kernel space 110 and user space 150. The driver representations 122 can include key-value pairs that are retrieved from the information property list of each driver. The key-value pairs can define a matching dictionary that is used to determine which driver is most suitable for each discovered device. The list of potential drivers can be narrowed by eliminating drivers of the wrong device type. The list of potential drivers can be further narrowed by eliminating drivers that do not match the specified vendor for the device. The remaining drivers may be allowed to actively probe the hardware and determine a probe score that indicates the assessment of the driver as to its suitability to drive the detected device. In one embodiment, drivers can also be assigned a priority that may favor one driver within a family over other drivers in the same family. Based on the probe score and/or priority, a driver can be selected to attempt to start the device and verify the driver's ability to drive the device. Within this matching process, user space drivers can directly compete against kernel space drivers to own a given device.

In one embodiment each driver has an I/O framework object 130 that represents the driver in the kernel space 110. In some examples the I/O framework object 130 maintains a communication connection 180 to the device driver 160 running in a process in user space 150. When an I/O framework process associated with the I/O framework object 130 is to create a driver object, the I/O framework process can synchronously spawn a driver daemon launcher 132 to launch the driver object or asynchronously trigger the creation of the driver object for the user space device driver 160.

In some examples user space device drivers 160 specify a server name 162 and a user class 164. The server name 162 is a rendezvous name for the process that hosts the driver environment in user space 150 and indicates to the system that a user space process needs to be launched and to wait for the process to check in with the kernel space 110. The user class 164 specifies the name of the user space driver 160. In some examples user space device drivers also specify a generic kernel class 166, which is a generic kernel object that translates application programming interfaces (APIs) to the actual implementation of a class which lives in user space 150. The kernel class may be a family-implemented class, or a kernel-implemented generic class. This class is responsible for bridging kernel-originated calls through to the user-level driver via automatically generated API code.

The user space device driver 160 further comprises a core driver logic 168 which resides in user space 150. Calls between the device driver 160 in user space 150 and the kernel space 110 may be handled via proxy objects. A proxy object 170 in user space 150 can be used to pass API messages to the kernel space 110. A proxy object 134 in kernel space may be used to pass API messages to the proxy object 170 in user space 150. The proxying is performed transparently to the driver logic implementation.

In some examples the proxy messages between the kernel space 110 and the user space 150 are relayed via an inter-process communication (IPC) link such as, for example, the Mach IPC process, which enables a full-featured capability model to be implemented for drivers. Other inter-process communication techniques may also be used. Before core driver logic 168 in user space 150 is permitted to access any object on the other side of a proxy object 170, an explicit capability to access that object must be granted. Drivers and clients of those drivers can be mutually untrusted. Mach IPC is implemented using messages exchanged over Mach ports, and messages can contain rights to access a port. Each Mach port can be associated with one receive right and one or more send rights and send-once rights, thereby creating a unidirectional communication channel that allows one receiver and one or more senders. A receive right names a queue associated with a port and authorizes the holder to dequeue messages from the queue (i.e., read from the port). The receive right also allows the holder to create send and send-once rights. Send and send-once rights designate a queue and authorize the holder of the right to enqueue messages (e.g., send to the port). Receive rights to a port can be sent in a message that is transmitted via another port. Messages can be exchanged over proxy endpoints only if the appropriate rights have been vended by the kernel.

In some examples an OSAction object may encapsulate a callback between processes. Internally, the OSAction object holds the target object instance and method with a reference constant. The driver 160 that is sent the action only sees an object by ID, and does not have access to the calling process's data. It can only invoke the action by calling a DoAsyncReadWriteCompletion( ) method with API-specific arguments.

Kernel logic in kernel space 110 owns the actual OSAction object. The kernel can be configured such that only drivers which have been issued an I/O can complete it and that clients only ever complete I/O operations that they have been issued. Integrity may be secured by the kernel for the contents of the OSAction object via Mach IPC semantics, although embodiments are not limited to the use of Mach IPC. Wrapping callbacks in OSAction with an opaque ID to which the kernel controls access prevents tampering and allows clients and drivers to be mutually untrusted.

In some examples a build tool generates the boiler plate headers and code needed to marshal arguments, generating code for both kernel space 110 and user space 150 versions of a defined API. In the kernel, methods may be defined as a single dispatch function and non-virtual methods that can be added to existing classes. The kernel can consume one pad slot in the OSObjectBase class (i.e., the very top) to be used for the Dispatch( ) method. In user space 150 an OSObject is defined to try to avoid fragile base class problems and avoid the custom linker currently used for kernel C++ binary compatibility. The only virtual method is the Dispatch( ) method and it is implemented in all classes.

Each class defines a single instance variable (ivar), which is a pointer to the specific instance variables for that version of the class implementation. Protected access to superclass ivars isn't allowed other than by accessor methods. The size of the object therefore never changes. This allows superclasses to change without needing to recompile subclasses. Class and method names may be hashed to arrive at a globally unique ID for each method in each class. This avoids the fragile base class problem by relying on the strength of the chosen hash algorithm to ensure there are no ID collisions. Furthermore, IDs only need to be unique within a particular class hierarchy because the RPC to an object will first arrive there based on a Mach send right to the C++ object and, once there, look at the payload to find the destination method's ID.

Figure 2:
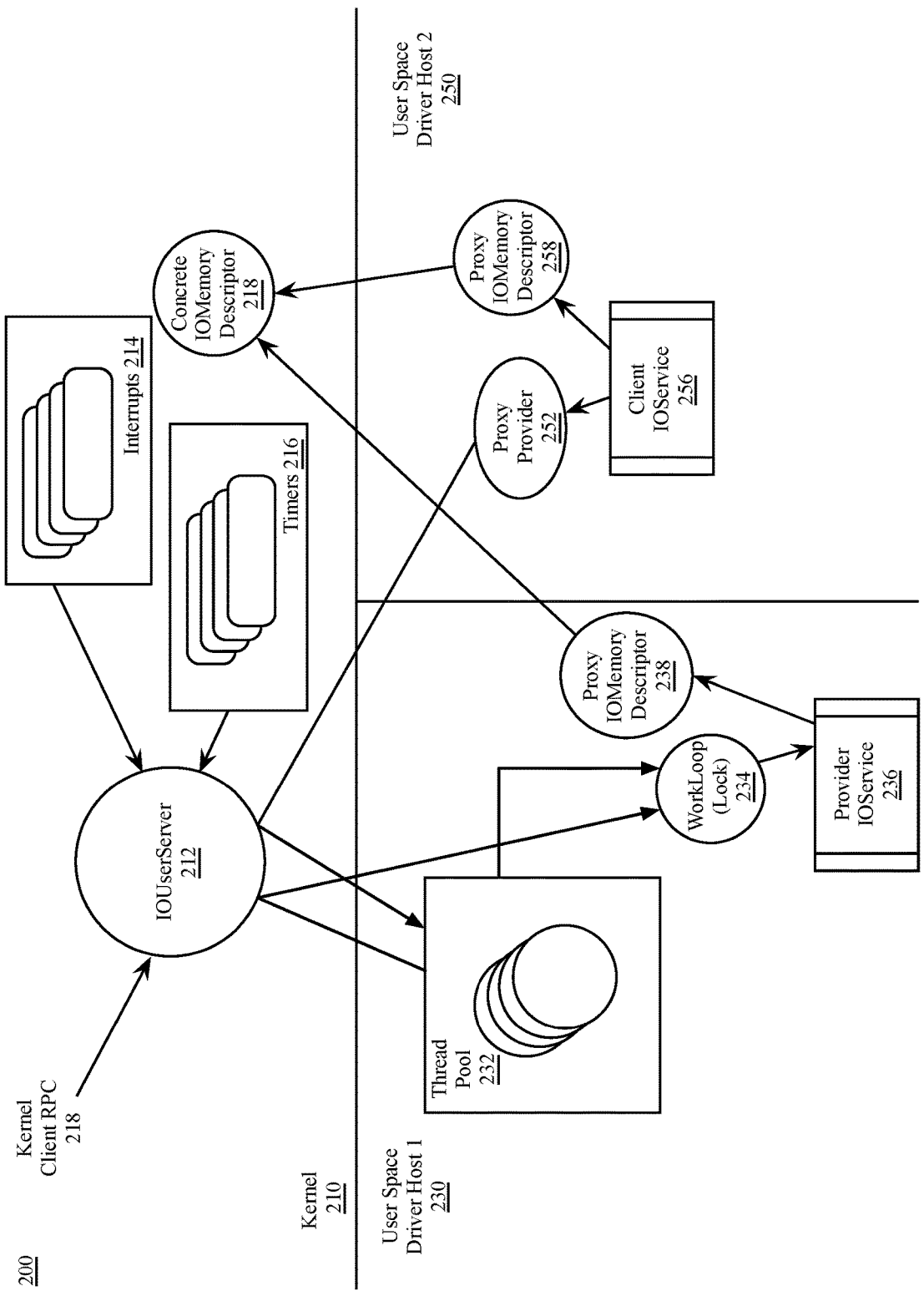
FIG. 2 is a schematic illustration of an operating environment in which managing drivers in user space may be implemented, according to embodiments.

FIG. 2 is a schematic illustration of an operating environment 200 in which managing drivers in user space may be implemented, according to embodiments. In one embodiment the environment includes a kernel 210, a first user space driver host 230, and a second user space driver host 250. The kernel 210 can include an IOUserServer 212 which receives interrupts 214, timer events 216, and kernel client remote procedure calls 219. The kernel 210 can include an IOUserServer 212 that represents a process hosting any number of I/O framework objects. The IOUserServer 212 is an IOUserClient subclass and is not associated with any particular device. Instead, the IOUserServer 212 can provide a bridge between functionality provided by the kernel 210 and functionality performed by processes in user space. The kernel 210 also includes a concrete IOMemory Descriptor 218, which can be accessed via proxy IO memory descriptors 238, 258.

The first user space driver host 230 may comprise logic to implement a thread pool 32, a work loop 234, a provider IOService 236, and a proxy IO memory descriptor 238. The second user space driver host 250 comprises a proxy provider 252, a client IOService 256, and a proxy IO memory descriptor 258. In one embodiment, the first user space driver host 230 and second user space driver host 250 can operate cooperatively, using a service provider/service client relationship.

In some examples the IOUserServer 212 receives interrupts 214, timer events 216, and kernel client remote procedure calls 219 and sends messages associated with those events to driver logic that resides in host processes in user space. Access to memory in the kernel 210 is gated through proxies. Before logic in the user space is allowed to access memory, a right to access such memory must be provided by the kernel 210. Callbacks between processes can be encapsulated within an action object that facilitates communication between the processes.

Source code to handle the proxy message relayed over IPC is automatically generated based on class descriptions. The generated source code can be used to dispatch from a virtual method to a corresponding implementation of the method defined explicitly for user space access. Kernel mode classes can define implementations for the virtual methods that bridge the user space API with the existing Kernel space API.

A process that hosts one or more drivers can open a connection to the kernel 210 using a rendezvous name. The process can then handle remote procedure calls (RPCs) to the objects hosted by the process. Objects can be hosted in separate processes, the same processes, or a combination thereof. The decision as to which objects are hosted in the same or separate processes can be made without impact to the code of the affected drivers, as all communication is performed over well-defined interfaces. The IPC mechanism can automatically determine if communication is to occur between drivers within the same process and can perform direct function calls instead of sending IPC messages. The host process may optionally be completely externally controlled and used to host drivers that do not have access to standard system APIs, allowing a driver to be completely isolated from the underlying system, with communication occurring entirely though proxies over IPC to other objects, which can monitor and secure the operations performed by such drivers.

In one embodiment the user space driver host process can include a thread pool comprised of one or more worker threads responsible for RPC. A thread in the pool 232 calls into the kernel 210 with the result data from the last RPC that the driver has executed and receives a new message if any are waiting. Exemplary messages can include interrupt and timer sources. If there are no messages waiting, the thread will block and go idle, or exit if there is >1 thread already waiting for this process and a policy to minimize wasted threads is in place. By contrast, if a thread picks up a message and there are no remaining threads to become the designated waiter, a new thread is launched so there is always at least one thread available to receive messages.

If an I/O framework object (e.g., I/O framework object 130) receives an RPC, either in response to a method call to a classic I/O framework kernel object, or a call from another process, the I/O framework object will place the data in the waiting thread. If there are no waiting threads, the I/O framework object will block waiting for a thread to trap into the kernel. Interrupts and timers can be registered with the IOUserServer 212 via an IODispatch object that represents a serial queue. These sources fire in the kernel, and wake any thread currently waiting for messages.

In some examples the increased efficiency of running drivers in user space may allow threads for those drivers to run at a lower runtime priority than previous implementations. In normal operation, user space runtime priorities are lower than user space priorities. In some examples it is possible to offer kernel runtime priorities to threads in privileged driver processes if the need arises. However, priority deflation is generally a desired outcome, and may be required to some degree to compensate for the expected decrease in overall efficiency of a userland solution. It is possible to run low-priority I/O at much lower runtime priorities, for more of the total I/O stack, than is possible with previous driver solutions, which enables the broad use of low-power driver states.

Having described various structures of a data processing system which may be adapted to implement managing drivers in user space, operating aspects will be explained with reference to FIG. 3.

Figure 3:
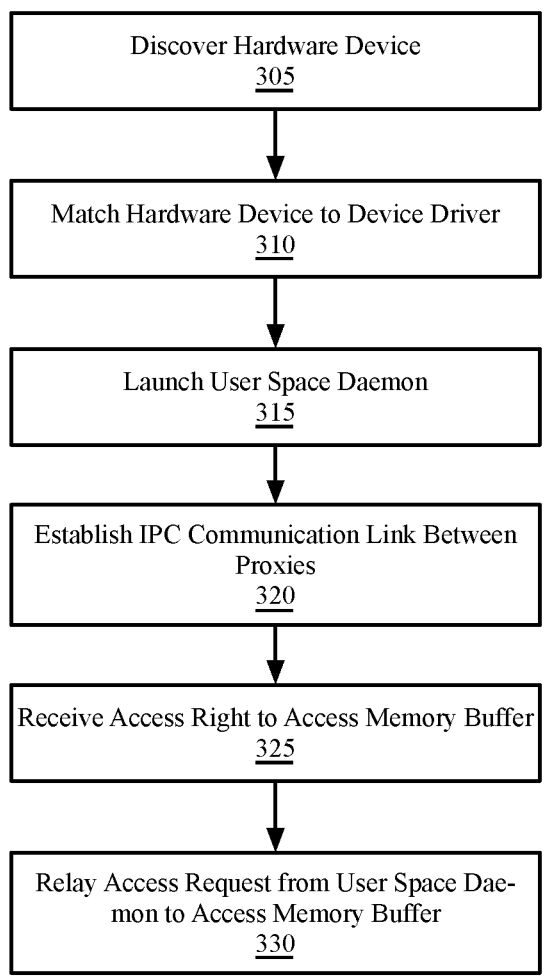
FIG. 3 is a flow diagram of a method for managing drivers in user space, according to embodiments.

FIG. 3 is a flowchart that illustrates a method 300 manage user space components of a device driver, according to embodiments. Method 300 includes operation 305, in which a hardware device is discovered on a system bus. For example, the hardware device may be discovered when it is communicatively connected to the data processing system which includes the operating system. Alternatively, the hardware device may be discovered during a boot process.

At operation 310, an appropriate user space driver is matched to the hardware device using a driver matching mechanism. At operation 315 a user space daemon associated with the selected user space driver is launched.

At operation 320 an IPC communication link is established between proxies. The software logic to enable the IPC link may be dynamically generated based at least in part on one or more class descriptions associated with the user space driver daemon. The IPC link can be established and used transparently to the logic of the user space driver daemon. Functions, methods, and resources that would be dynamically linked if the driver were compiled as a kernel space driver can be linked via dynamically generated IPC interfaces when the driver is compiled as a user space driver. User space functionality can then be linked over the IPC communication link via programmatically invokable proxy interfaces.

At operation 325 access rights to access a memory buffer in the kernel space are received, for example, from a process executing in the kernel. In some examples obtaining an access right may involve initiating a call from the first daemon to the kernel space and processing one or more messages received in a callback from the kernel space. The messages may be encapsulated in the callback from the kernel space in an object, and the access rights may be granted in the kernel space. At operation 330 a memory access request is relayed from a user space daemon to the access memory buffer.

Thus, the operations depicted in FIG. 3 enable device drivers with operational logic that resides in user space to access memory resources that reside in kernel space.

Figure 4:
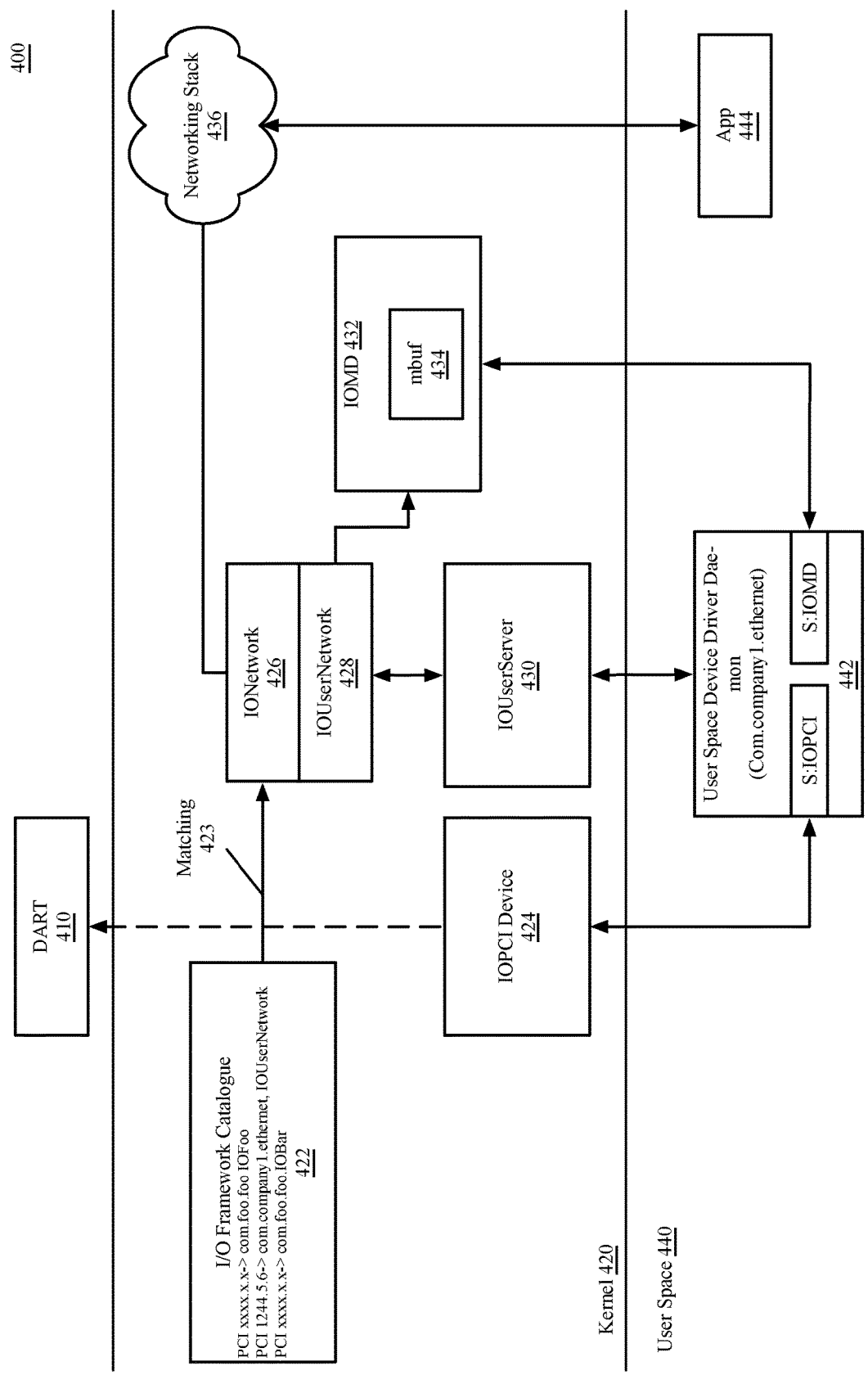
FIG. 4 is a schematic illustration of an operating environment in which managing drivers in user space may be implemented, according to embodiments.

FIG. 4 is a schematic illustration of an operating environment 400 in which operational logic of a device driver may be implemented within user space, according to embodiments. The operating environment 400 also includes a kernel 420 and a user space 440 execution environments. The operating environment 400 shown is for an exemplary PCI-based network device (e.g., Ethernet) with driver logic that resides user space 440, and is exemplary as to one embodiment. Other embodiments are not limited as to the type of device that can be driven.

Kernel 420 comprises an I/O framework catalogue 422, an IOPCI device object 424, an IONetwork object 426, an IOUserNetwork object 428, an IOUserServer object 430, and an IO memory descriptor (IOMD) 432 which references memory buffer 434. The I/O framework catalogue 422 can be a variant of the I/O framework catalog 120 of FIG. 1. The I/O framework catalogue 422 maintains entries for all available drivers on a system. When a device is discovered in the system, the kernel can request a list of all drivers of the device's family from the I/O framework catalog 422 and perform the matching operation 423 to select a device driver.

The IOPCI device object 424 defines an access point and communication channel for devices connected to a PCI bus. In one embodiment, the IOPCI device object 424 is a nub object that facilitates functionality such as arbitration and power management. In one embodiment, the IOPCI device facilitates driver matching for any device that is attached to a PCI bus within a system. The IOPCI device object 424 can facilitate access to device memory. For example, the IOPCI device object 424 can access a device address resolution table (DART) 410, which may be a component of a memory controller of a system or device. The DART 410 can enable memory buffers allocated in the kernel 420 to be mapped into the address space of a connected device. Different nub objects can be used for different interfaces. For example, an IOUSB device object may be used to facilitate communication with USB devices.

The IOMD 432 describes how a stream of data should be laid into memory or extracted from memory. The IOMD 432 can represent a segment of memory that holds the data involved in an I/O transfer and can be specified as one or more physical or virtual address ranges. The IMD allows objects within a driver stack to map a memory buffer into various user mode or kernel mode address spaces to facilitate the transfer of information out of or into that memory.

The IONetwork object 426 can facilitate communication between the networking stack 436 and the device driver that is to drive an attached networking device. An application 444 that is to access the networking device can communicate via the networking stack 436. The underlying implementation of the driver (e.g., user space, kernel space) is abstracted from the application 444. The IONetwork object 426 may communicate with or be a superclass of the IOUserNetwork object 428. The IOUserNetwork object 428 is a kernel space object that bridges user space driver logic with the IONetwork object 426. The IOUserNetwork object 428 connects with the user space logic via the IOUserServer object 430.

In operation, the kernel 420, facilitated by the IOPCI device object 424, can perform a matching process to match drivers to devices. To launch the selected driver, the kernel 420 can create the IOUserNetwork object 428 and the IOUserServer object 430. The IOUserServer object 430 can asynchronously launch the user space device driver daemon 442 in the user space 440. The user space device driver daemon 442 can receive details about the matched device from the IONetwork object 426 and access the matched device via a proxy to the IOPCI device object 424 (e.g., S:IOPCI). The user space device driver daemon 442 can then probe and start the attached device.

To send or receive data via the attached device, the IOUserNetwork object 428 can allocate a memory buffer 434, which can be defined by the IOMD 432. The user space device driver daemon 442 is provided access to the memory buffer 434 sending an access capability for the memory to the user space device driver daemon 442 via the IOUserServer object 430. The user space device driver daemon 442 can create a proxy to the IOMD 432 (e.g., S:IOMD). An access right to the S:IOMD proxy can then be sent to the IOPCI device object 424 via the S:IOPCI proxy, which can cause the memory buffer 434 to be mapped into the address space of the device.

Using the techniques described above, the user space device driver daemon 442 can communicate with attached devices (e.g., via the IOPCI device object 424) and facilitate communication between the attached device and kernel allocated memory (e.g., memory buffer 434) via the use of proxy connections that transparently translate programmatic invocations into inter-process communication (IPC) calls. Access to kernel allocated resources are gated via access rights that can be exchanged between processes. In one embodiment, the access rights are the send and receive rights that enable the underlying functionality of the IPC channel.

IPC Communication Link

Figure 5:
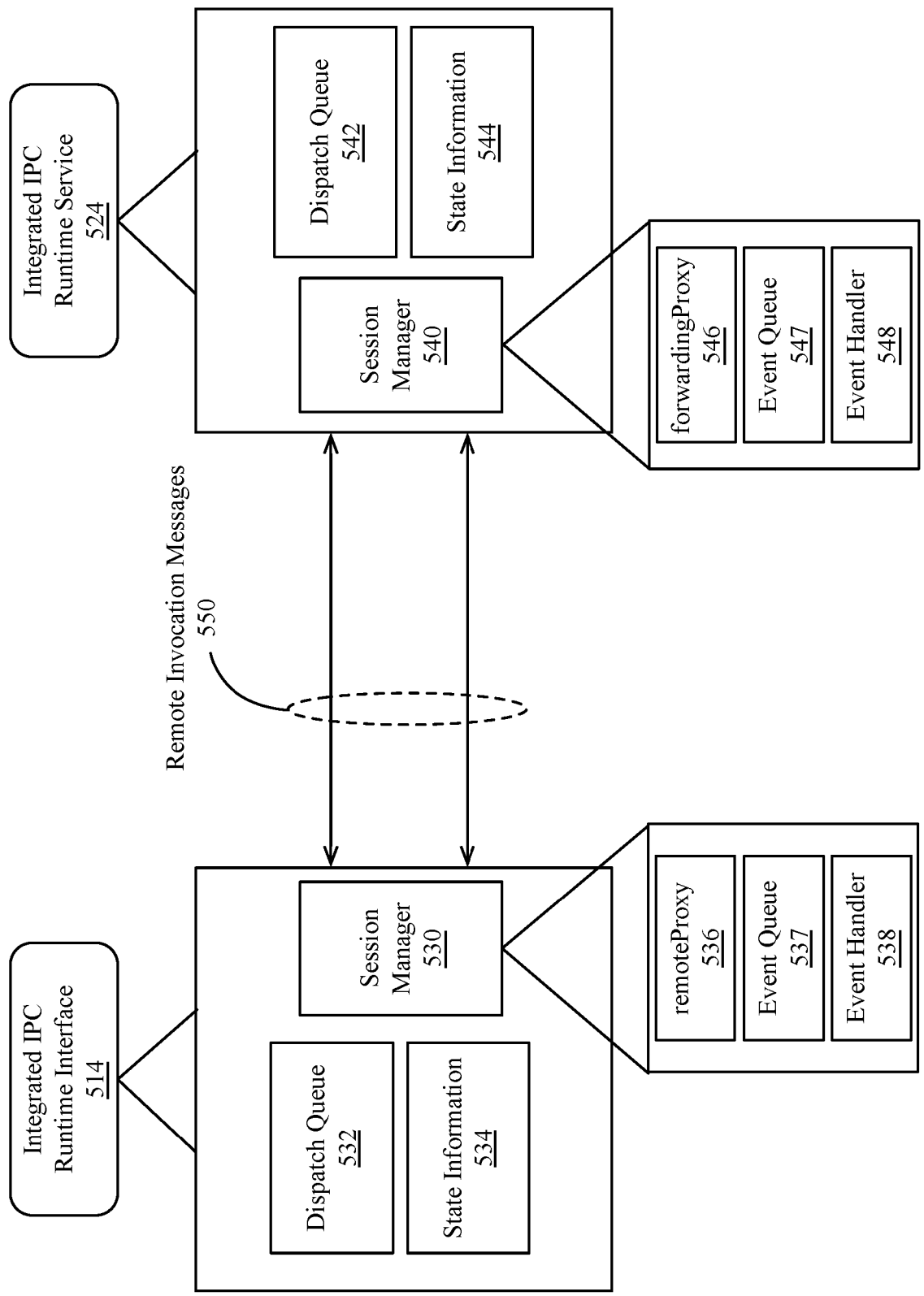
FIG. 5-6 illustrate elements of the IPC communication link that can be used to bridge user mode driver logic with kernel mode driver logic.
Figure 6:
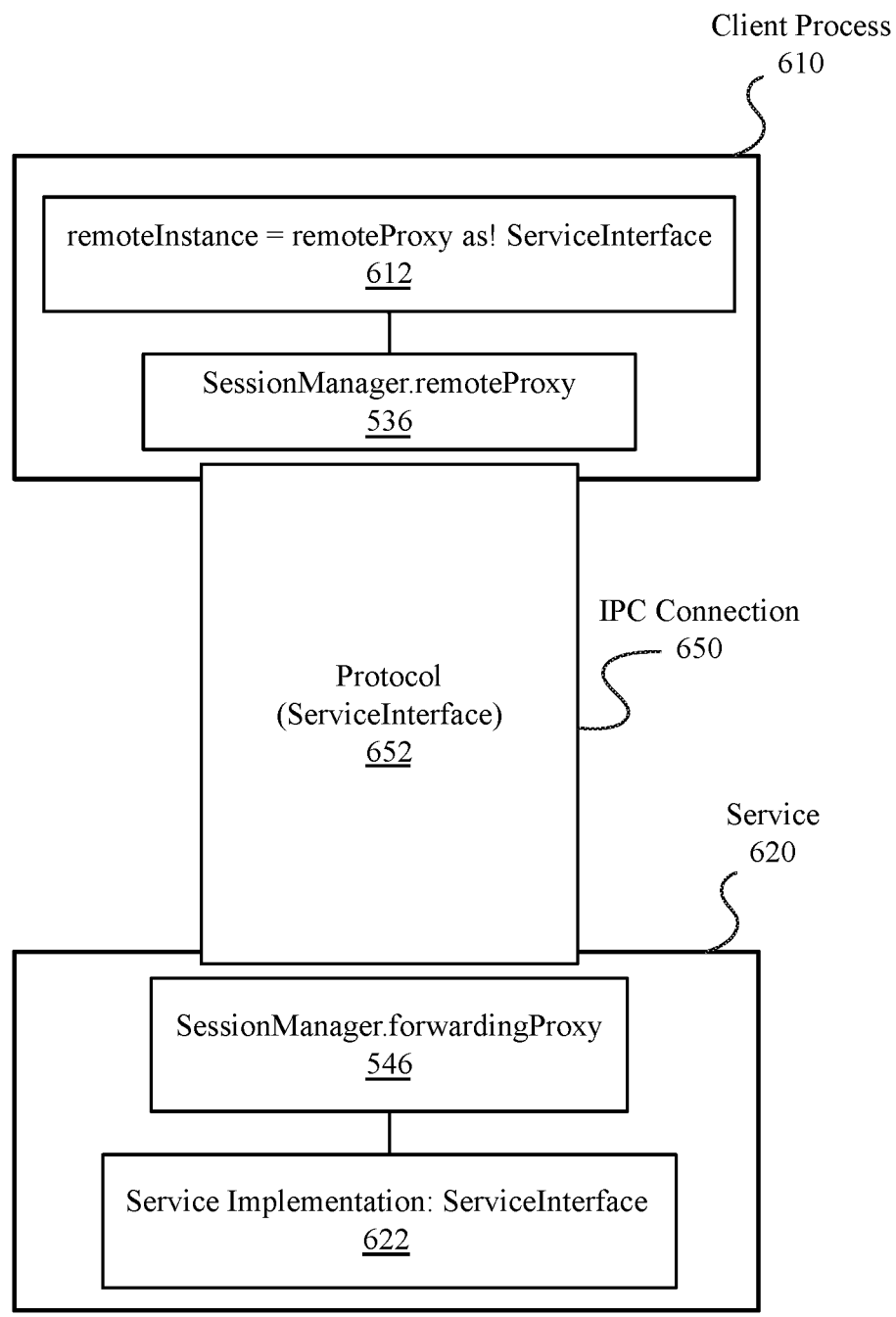

FIG. 5-6 illustrate elements of the IPC communication link that can be used to bridge user mode driver logic with kernel mode driver logic. The IPC communication link can also be used to enable cross-process communication between user mode drivers in different processes. The program logic to construct the IPC communication link can be dynamically generated when a driver is compiled as a user space driver. Instead of dynamically linking the driver to various kernel mode libraries and objects, program code is generated to enable remote invocation of functionality over IPC via proxies.

FIG. 5 illustrates elements of an IPC communication link that can facilitate execution of user space driver logic, according to one embodiment. In one embodiment, remote invocation messages 550 can be sent between an integrated IPC runtime interface 514 and the integrated IPC runtime service 524 using an inter-process communication channel as a transport medium. The remote invocation messages 550 enable the remote invocation of methods and objects across processes using proxy execution state.

In one embodiment the IPC connection over which the remote invocation messages 550 are transmitted is managed by session managers 530, 540 in each side of the connection. The session managers 530, 540 can create an IPC connection, configure event queues 537, 547 and event handlers 548, and establish proxy connections for each plugin (e.g., remote proxy 536, forwarding proxy 546). The session managers 530, 540 can send and receive remote invocation messages 550 and directly perform operations based on those messages or insert workloads into dispatch queues 532, 542. Remote proxies of objects can be invoked programmatically as through the remote proxy were local. In one embodiment, dispatch queue 532 and dispatch queue 542 can represent proxy views of the same logical queue, where the logical queue has state information that is reflected via state information 534, 544 at each endpoint. In one embodiment, state information 534, 544 includes local execution state and proxy state for remote invocations.

In one embodiment, cross-process functionality can be performed via the use of dispatch queues that can be used to exchange self-contained blocks of functionality between processes. The IPC connection can be used to enable a dispatch queue 532 within the integrated IPC runtime interface 514 can exchange workload requests with a dispatch queue 542 within the integrated IPC runtime service. State information 534, 534 associated with the dispatch queues 532, 542 can also be relayed over the IPC connection. In one embodiment, dispatch queues 532, 542 and state information 534, 144, and other data associated with each end of the IPC connection are synchronized via proxies on each end of the IPC connection.

The IPC runtime interface 514 and integrated IPC runtime service 524 can be used to implement specific programming language functionality. In one embodiment, functionality provided by the Objective-C programming language or the Swift programming language can be enabled. For example, Objective-C blocks and Swift closures can be exchanged over the IPC connection as remote invocation messages 550. Additionally, Swift completion handlers can also be used to provided program logic that can automatically run after the completion of other requested functionality. Objective-C and Swift are provided as example languages supported by one embodiment and the calling semantics of any programming language can be supported. For example, the C and C++ programming language can also be supported.

FIG. 6 is a block diagram of program logic to enable remote invocation of service functionality at a client application, according to an embodiment. In one embodiment, a client process 610 can remotely invoke functionality provided by a service 620 over a protocol 652. The protocol 652 can be used to define functionality that will be remotely accessible to the client process 610 over the IPC connection 650. The forwarding proxy 546 links the protocol 652 with the service implementation 622. The service implementation 622 implements the underlying functionality that is accessed by the client process 610. The remote proxy 536 in the client process 610 links the protocol 652 with the remote instance 612 of the service functionality that is accessed by the client process 610. The program logic of the client process 610 can create a remote instance 612 of the service functionality by converting the remote proxy 536 to the data type of the service interface exposed via the protocol 652 and the forwarding proxy 546 within the service 620. The remote instance can then be invoked in the same manner as the service implementation 622 within the service 620.

In one embodiment, the remote implementation models for objects can vary, and objects can be implemented remotely across processes using one of multiple models. In one embodiment an object can be snapshotted, such that a persistent view of the object can be sent across the IPC connection 650 when the object is remotely accessed. In one embodiment an object can be impersonated, such that an opaque identifier (e.g., UUID, integer) can be used to represent a conceptual object on each side of the IPC connection 650. Programming interfaces can reference the opaque identifier to explicitly select an object to access. Impersonation can be used to remotely present an entire class interface. If a class implements a protocol and the protocol is implemented over the interface, remote function calls can be made that automatically traverse the IPC connection 650. In one embodiment, objects can be configured to perform custom serialization and deserialization of data on that traverses the IPC connection 650, which allows the streaming of data over the IPC connection 650. In one embodiment, objects can be configured that can interpose program logic before data is transmitted over the IPC connection 650, which can be used to enable special handling of data or function calls. For example, if a group of asynchronous messages are to be transmitted over the IPC connection, interposing program logic can be configured that bundles the asynchronous messages before transmission. In one embodiment, interposing logic can be configured as part of the protocol 652 which relays data over the IPC connection 650. Interposing logic can be of particular use to the client process 610, which use an interposer to intercept and adapt any function call made by the client process 610 to the service implementation 622.

Figure 7:
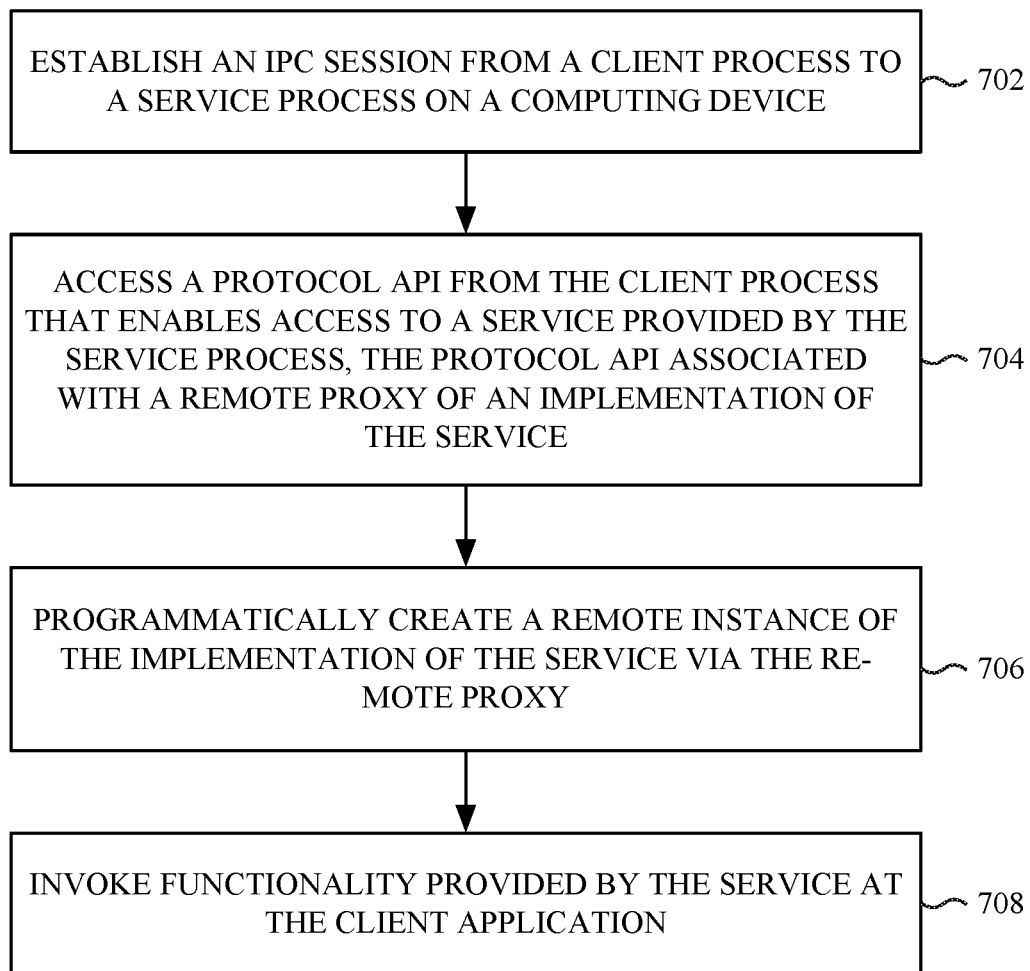
FIG. 7 is a method remotely invoking programmatic functionality between processes, according to an embodiment.

FIG. 7 is a method 700 remotely invoking programmatic functionality between processes, according to an embodiment. Method 700 can be implemented by a processor of a computing system based on instructions provided by the dynamically generated IPC logic described herein. Method 700 enables an object provided by a service module to be remotely invoked by a client application as though the object is a local object. Method 700 can be used to enable the programmatic interaction between user mode driver logic and kernel mode functions, methods, and resources. Method 700 can also be used to enable the programmatic interaction between user mode driver logic across user mode processes.

In one embodiment, method 700 includes operation 702, which establishes an IPC session from a client application to a service process on a computing device. At operation 704, method 700 can access a protocol API from the client application that enables access to a service provided by the service process, the protocol API associated with a remote proxy of an implementation of the service. At operation 706, method 700 can programmatically create a remote instance of the implementation of the via the remote proxy to the implementation of the service. At operation 708, method 730 can invoke functionality provided by the service at the client application. Programmatic remote access to a variety of services can be enabled, including any data, function, or method within the service process.

Exemplary API Structure

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the other set of APIs.

Figure 8:
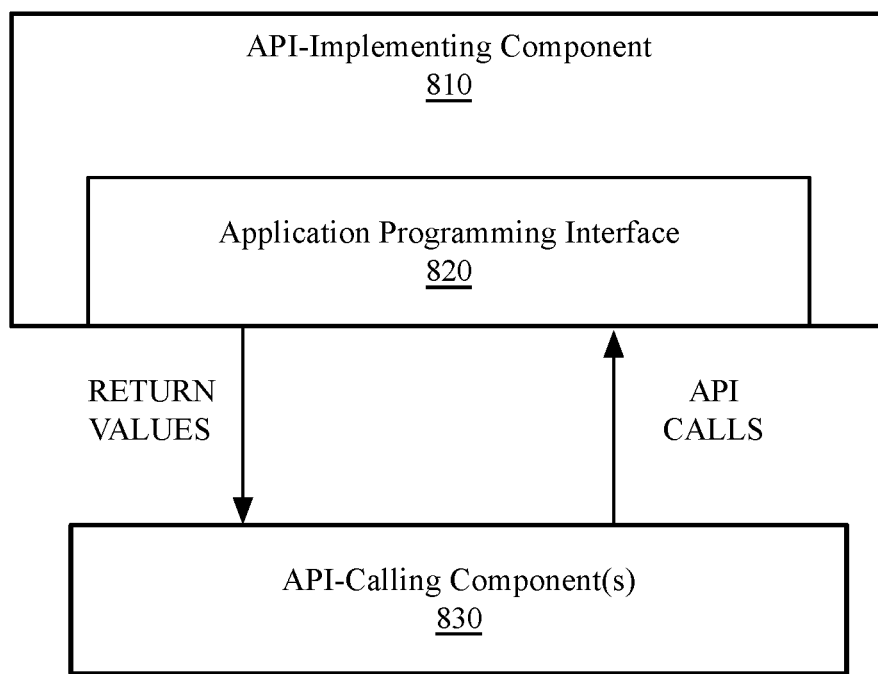
FIG. 8 is a block diagram illustrating an exemplary API architecture, which may be used in some embodiments of the invention.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, software, or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates an API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 9A:
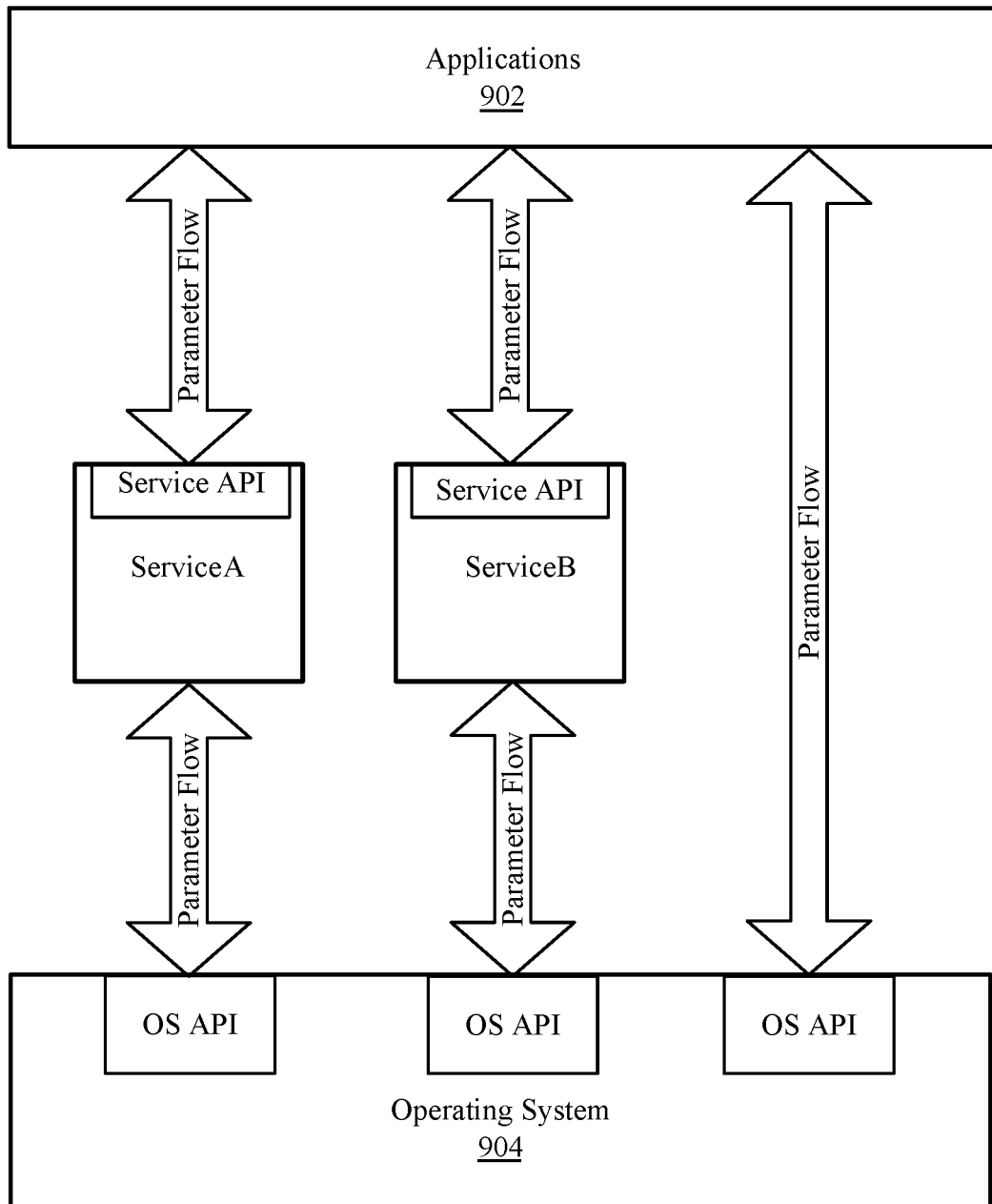
FIG. 9A-9B are block diagrams of exemplary API software stacks, according to embodiments.
Figure 9B:
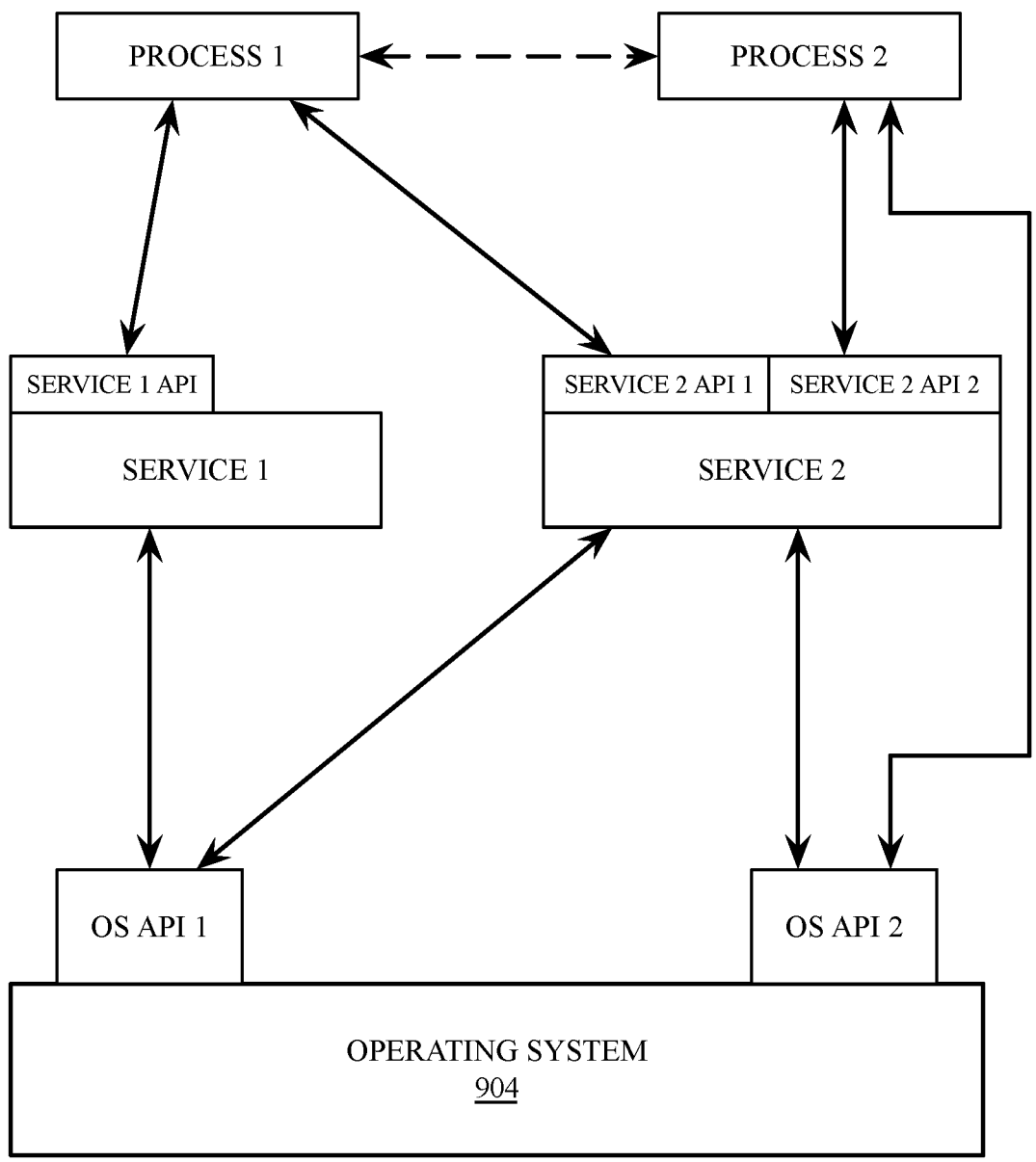

FIG. 9A-9B are block diagrams of exemplary API software stacks 900, 910, according to embodiments. FIG. 9A shows an exemplary API software stack 900 in which processes 902 can make calls to Service A or Service B using Service API and to Operating System 904 using an OS API. Additionally, Service A and Service B can make calls to Operating System 904 using several OS APIs. The processes 902, in one embodiment, are multiple processes operating in concert to enable a multi-process application as described herein.

FIG. 9B shows an exemplary API software stack 910 including Process 1 (902A), Process 2 (902B), Service 1 (905), Service 2 (906), and Operating System 904. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2. Service 1 can be, for example, a mobile UI framework as described herein, while Service 2 can be a host UI framework as described herein. Service 1 API and Service 2 API can be APIs implemented via a variant of the integrated IPC runtime interface described herein, which can enable interoperability between Process 1 and Process 2.

Additional Computing Device Architectures

Figure 10:
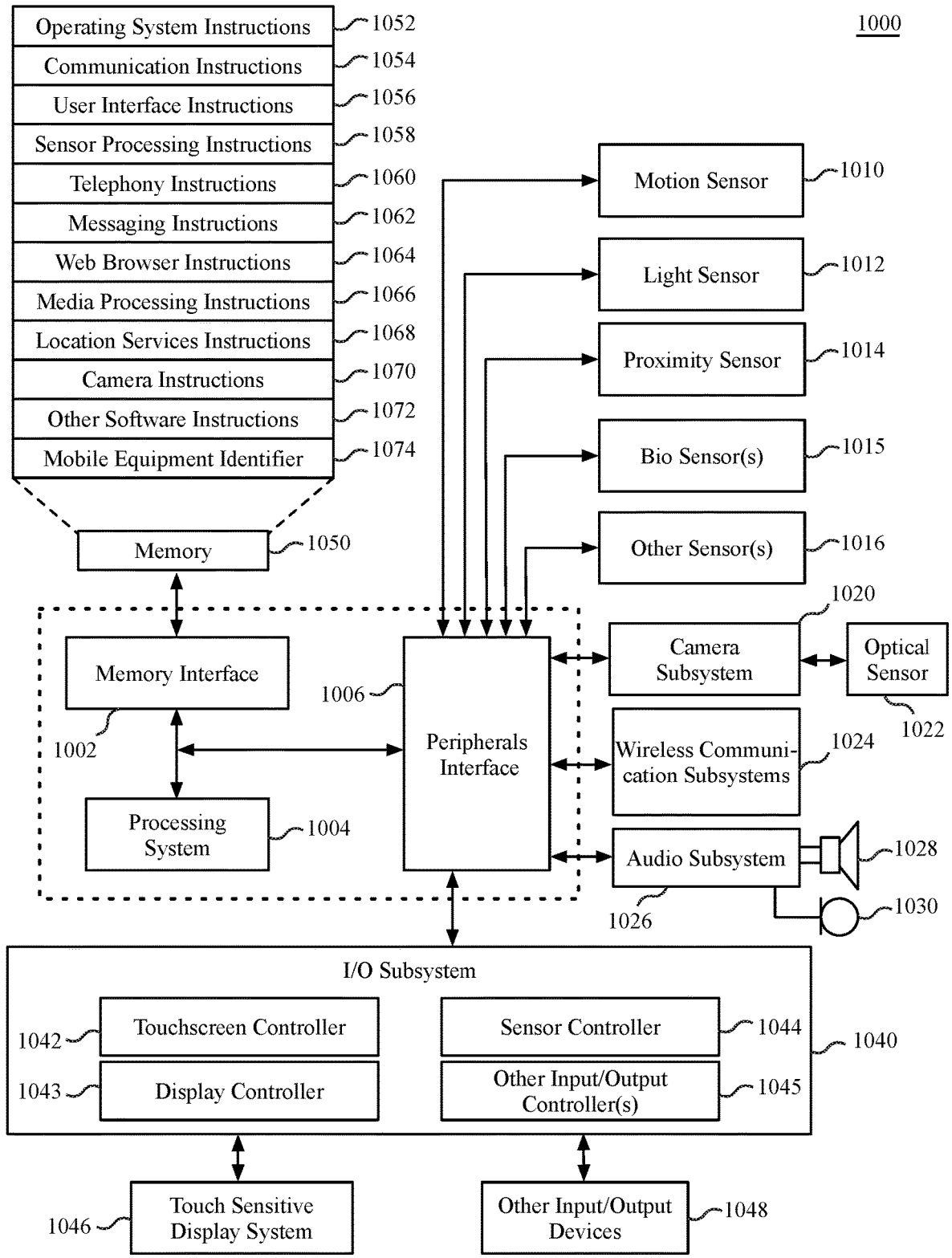
FIG. 10 is a block diagram of a device architecture for a mobile or embedded device, according to an embodiment.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio system including support for virtual surround sound.

The I/O subsystem 1040 can include a touch screen controller 1042 and/or other input controller(s) 1045. For computing devices including a display device, the touch screen controller 1042 can be coupled to a touch sensitive display system 1046 (e.g., touchscreen). The touch sensitive display system 1046 and touch screen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
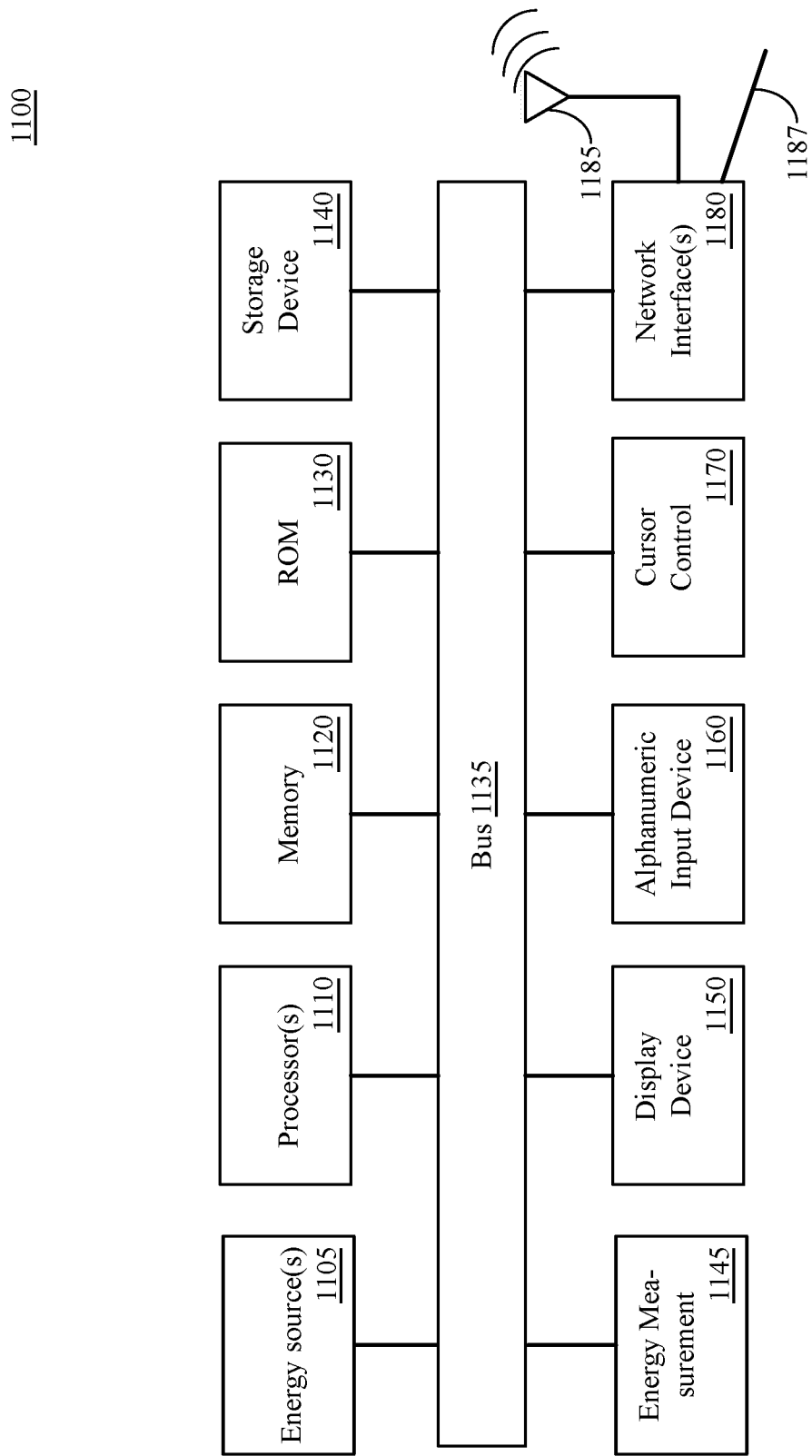
FIG. 11 is a block diagram of a computing system, according to an embodiment.

FIG. 11 is a block diagram of a computing system 1100, according to an embodiment. The illustrated computing system 1100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1100 can be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120, which may be random access memory (RAM) or another dynamic storage device coupled to the bus 1135. The memory 1120 may store information and instructions that may be executed by processor(s) 1110. The memory 1120 may also be main memory that is used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna(e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the processor can use an instruction set which may be an extension to an instruction set architecture for particular a type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a predictive failure analysis method and service that enables design-time error and exception handling techniques to be supplemented or assisted by a predictive failure analysis system. In some embodiments, the predictive failure analysis system enables the dynamic injection of software routines into error and event handlers to enable the error and event handlers to respond to potential software failures without requiring software developers to have anticipated such errors at design time.

One embodiment provides an electronic device, comprising a non-transitory machine-readable medium to store instructions; one or more processors to execute the instructions; and a memory coupled to the one or more processors, the memory to store the instructions which, when executed by the one or more processors, cause the one or more processors to receive injection of dynamic error detection logic into the instructions, the dynamic error detection logic including a failure predictor to publish a failure prediction based on a stream of observed events on the electronic device.

One embodiment provides for a non-transitory machine-readable medium storing instructions which, when executed by one or more processors of an electronic device, cause the one or more processors to perform operations comprising storing an input event as a candidate for failure event analysis; detecting a predictive failure trend in stored input event log data; generating a plurality of predicted tables of failure knowledge data; mapping a predictive failure trend to the plurality of predicted tables; and issuing a failure event to an observer in response to detection of a match between the predictive failure trend and the failure knowledge data.

One embodiment provides for a data processing system comprising one or more processors; and a memory coupled to the one or more processors, the memory storing instructions which, when executed by the one or more processors, cause the data processing system to perform operations to receive injection of dynamic error detection logic into the instructions, the dynamic error handling logic including an error handling update to indicate a response to a predicted failure; receive a set of events indicative of the predicted failure; and respond to the set of events according to the error handling update.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A data processing system, comprising:
   a computer-readable memory to store data and instructions;
   a communication bus;
   one or more processors communicatively coupled to the communication bus, the one or more processors to execute instructions which cause the one or more processors to perform operations, comprising:
   discovering a hardware device communicatively coupled to the communication bus;
   launching a user space driver daemon;
   establishing an inter-process communication (IPC) link between a first proxy interface for the user space driver daemon and a second proxy interface for a server process in a kernel space;
   receiving, at the first proxy interface, an access right to enable access to a memory buffer in the kernel space; and
   relaying an access request for the memory buffer from the user space driver daemon via a third-party proxy interface to enable the user space driver daemon to access the memory buffer, the access request based on the access right.

2. The data processing system as in claim 1, the one or more processors to execute instructions which cause the one or more processors to perform operations, comprising:
 locating a set of daemons associated with the hardware device; and
 selecting a first daemon in the set of daemons as the user space driver daemon, wherein the first daemon is selected based at least in part on a priority of the first daemon relative to priority levels associated with one or more other daemons in the set of daemons.

3. The data processing system as in claim 2, wherein the IPC link is established dynamically based at least in part on one or more class descriptions associated with the user space driver daemon.

4. The data processing system as in claim 2, wherein the IPC link is transparent to the user space driver daemon.

5. The data processing system as in claim 2, the one or more processors to execute instructions which cause the one or more processors to perform operations, comprising:
 initiating a call from the first daemon to the kernel space; and
 processing one or more messages received in a callback from the kernel space.

6. The data processing system as in claim 5, the one or more processors to execute instructions which cause the one or more processors to perform operations, comprising:
 encapsulating the one or more messages within an object.

7. The data processing system as in claim 1, the one or more processors to execute instructions which cause the one or more processors to perform operations, comprising:
 granting the access right in the kernel space.

8. A non-transitory machine-readable medium storing instructions which, when executed by one or more processors of an electronic device, cause the one or more processors to perform operations comprising:
 discovering a hardware device communicatively coupled to a communication bus;
 launching a user space driver daemon;
 establishing an inter-process communication (IPC) link between a first proxy interface for the user space driver daemon and a second proxy interface for a server process in a kernel space;
 receiving, at the first proxy interface, an access right to enable access to a memory buffer in the kernel space; and
 relaying an access request for the memory buffer from the user space driver daemon via a third-party proxy interface to enable the user space driver daemon to access the memory buffer, the access request based on the access right.

9. The non-transitory machine-readable medium as in claim 8, the operations additionally comprising:
 locating a set of daemons associated with the hardware device; and
 selecting a first daemon in the set of daemons as the user space driver daemon, wherein the first daemon is selected at least in part on a priority of the first daemon relative to priority levels associated with one or more other daemons in the set of daemons.

10. The non-transitory machine-readable medium as in claim 9, wherein the IPC link is established dynamically based at least in part on one or more class descriptions associated with the user space driver daemon.

11. The non-transitory machine-readable medium as in claim 10, wherein the IPC link is transparent to the user space driver daemon.

12. The non-transitory machine-readable medium as in claim 11, the operations additionally comprising:
 initiating a call from the first daemon to the kernel space; and
 processing one or more messages received in a callback from the kernel space.

13. The non-transitory machine-readable medium as in claim 12, the operations additionally comprising:
 encapsulating the one or more messages in the callback from the kernel space in an object.

14. The non-transitory machine-readable medium as in claim 13, the operations additionally comprising:
 granting the access right in the kernel space.

15. A computer-implemented method comprising:
 in an electronic device including a communication bus:
  discovering a hardware device communicatively coupled to the communication bus;
  launching a user space driver daemon;
  establishing an inter-process communication (IPC) link between a first proxy interface for the user space driver daemon and a second proxy interface for a server process in a kernel space;
  receiving, at the first proxy interface, an access right to enable access to a memory buffer in the kernel space; and
  relaying an access request for the memory buffer from the user space driver daemon via a third-party proxy interface to enable the user space driver daemon to access the memory buffer, the access request based on the access right.

16. The computer-implemented method as in claim 15, further comprising:
 locating a set of daemons associated with the hardware device; and
 selecting a first daemon in the set of daemons as the user space driver daemon, wherein the first daemon is selected at least in part on a priority of the first daemon relative to priority levels associated with one or more other daemons in the set of daemons.

17. The computer-implemented method as in claim 16, wherein the IPC link is established dynamically based at least in part on one or more class descriptions associated with the user space driver daemon.

18. The computer-implemented method as in claim 16, wherein the IPC link is transparent to the user space driver daemon.

19. The computer-implemented method as in claim 18, additionally comprising:
 initiating a call from the first daemon to the kernel space; and
 processing one or more messages received in a callback from the kernel space.

20. The computer-implemented method as in claim 19, additionally comprising:
 encapsulating the one or more messages in the callback from the kernel space in an object; and
 granting the access right in the kernel space.

* * * * *